United States Patent
Sugiura (10) Patent No.: US 10,770,724 B2
(45) Date of Patent: Sep. 8, 2020

(54) POSITIVE ELECTRODE MATERIAL FOR LITHIUM SECONDARY BATTERIES

(71) Applicant: TOYOTA JIDOSHA KABUSHIKI KAISHA, Toyota-shi, Aichi-ken (JP)

(72) Inventor: Ryuta Sugiura, Toyohashi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/190,841

(22) Filed: Nov. 14, 2018

(65) Prior Publication Data

US 2019/0148720 A1     May 16, 2019

(30) Foreign Application Priority Data

Nov. 16, 2017   (JP) .................. 2017-220938

(51) Int. Cl.
*H01M 4/02*      (2006.01)
*H01M 4/36*      (2006.01)
*H01M 4/525*     (2010.01)
*H01M 4/1391*    (2010.01)
*H01M 4/04*      (2006.01)
(Continued)

(52) U.S. Cl.
CPC ............. *H01M 4/366* (2013.01); *H01M 4/04* (2013.01); *H01M 4/0416* (2013.01); *H01M 4/1391* (2013.01); *H01M 4/505* (2013.01); *H01M 4/525* (2013.01); *H01M 10/052* (2013.01); *H01M 2004/028* (2013.01)

(58) Field of Classification Search
CPC ...... H01M 4/366; H01M 4/04; H01M 4/0416; H01M 4/1391; H01M 4/505; H01M 4/525; H01M 10/052; H01M 2004/028
See application file for complete search history.

(56) References Cited

U.S. PATENT DOCUMENTS

2001/0053480 A1   12/2001   Koga et al.
2011/0027661 A1   2/2011    Okazaki et al.
2011/0195310 A1   8/2011    Kawamoto et al.
(Continued)

FOREIGN PATENT DOCUMENTS

EP    3 229 295 A1     10/2017
JP    2001-202960 A    7/2001
(Continued)

*Primary Examiner* — Jane J Rhee
(74) *Attorney, Agent, or Firm* — Sughrue Mion, PLLC (57) ABSTRACT

Provided is a positive electrode material that allows reducing the resistance of a lithium secondary battery. The positive electrode material for lithium secondary batteries disclosed herein contains positive electrode active material particles each having a layered structure; and at least one conductor selected from the group consisting of a lithium conductor and an electronic conductor, and disposed on a surface of the positive electrode active material particles. In a case where the positive electrode material contains the lithium conductor, the proportion of the lithium conductor disposed at planes other than the (003) plane of the positive electrode active material particle, with respect to the total amount of the lithium conductor, is not less than 50% and not more than 100%. In a case where the positive electrode material contains the electronic conductor the proportion of the electronic conductor disposed at the (003) plane of the positive electrode active material particle, with respect to the total amount of the electronic conductor, is not less than 50% and not more than 100%.

10 Claims, 2 Drawing Sheets

(51) Int. Cl.
*H01M 4/505* (2010.01)
*H01M 10/052* (2010.01)

(56) References Cited

U.S. PATENT DOCUMENTS

| | | |
|---|---|---|
| 2015/0236373 A1 | 8/2015 | Ohtomo et al. |
| 2017/0033398 A1 | 2/2017 | Yokoyama |
| 2017/0155134 A1 | 6/2017 | Sugiura |

FOREIGN PATENT DOCUMENTS

| | | |
|---|---|---|
| JP | 2001-266879 A | 9/2001 |
| JP | 2011-165404 A | 8/2011 |
| JP | 2014-22204 A | 2/2014 |
| JP | 2015-156297 A | 8/2015 |
| JP | 2017-33689 A | 2/2017 |
| KR | 10-2010-0120153 A | 11/2010 |

FIG.1

POSITIVE ELECTRODE MATERIAL FOR LITHIUM SECONDARY BATTERIES

BACKGROUND OF THE INVENTION

1. Field of the Invention

The present teaching relates to a positive electrode material for lithium secondary batteries. The present application claims priority to Japanese Patent Application No. 2017-220938 filed on Nov. 16, 2017, the entire contents whereof are incorporated herein by reference.

2. Description of the Related Art

In recent years, lithium secondary batteries have come to being suitably used as portable power sources in personal computers, mobile terminals and the like, and as driving power sources for vehicles such as electric vehicles (EV), hybrid vehicles (HV) and plug-in hybrid vehicles (PHV). Further improvements in the performance of lithium secondary batteries are being demanded as these batteries have become widespread. Ordinarily, positive electrode active materials capable of storing and releasing lithium ions are used in the positive electrode of lithium secondary batteries. There are known techniques (for instance Japanese Patent Application Publication Nos. 2014-022204 and 2001-202960) that involve coating positive electrode active material particles with a lithium conductor or electronic conductor, in order to increase the performance the lithium secondary battery.

SUMMARY OF THE INVENTION

As a result of diligent research, the inventors have found that there is still room for improvement as regards reducing the resistance of lithium secondary batteries that are constructed using a conventional positive electrode material obtained by coating positive electrode active material particles with a lithium conductor or electronic conductor.

It is thus an object of the present teaching to provide a positive electrode material that allows reducing the resistance of a lithium secondary battery.

The positive electrode material for lithium secondary batteries disclosed herein contains positive electrode active material particles each having a layered structure; and at least one conductor selected from the group consisting of a lithium conductor and an electronic conductor, and disposed on a surface of the positive electrode active material particles. In a case where the positive electrode material contains the lithium conductor, the proportion of the lithium conductor disposed at planes other than the (003) plane of the positive electrode active material particle, with respect to the total amount of the lithium conductor, is not less than 50% and not more than 100%. In a case where the positive electrode material contains the electronic conductor, the proportion of the electronic conductor disposed at the (003) plane of the positive electrode active material particle, with respect to the total amount of the electronic conductor, is not less than 50% and not more than 100%.

In the above configuration, a large amount of lithium conductor is disposed at planes other than the (003) plane, being planes at which lithium ions enter and leave. Alternatively, a large amount of electronic conductor is disposed at the (003) plane, being a plane at which lithium ions do not enter or leave. Such a configuration allows reducing the resistance of the lithium secondary battery.

In a desired aspect of the positive electrode material for lithium secondary batteries disclosed herein, the proportion of the lithium conductor disposed at planes other than the (003) plane of the positive electrode active material particle, with respect to the total amount of the lithium conductor, is not less than 70% and not more than 100%.

The battery resistance lowering effect is particularly pronounced in such a configuration.

In a desired aspect of the positive electrode material for lithium secondary batteries disclosed herein, the proportion of the electronic conductor disposed on the (003) plane of the positive electrode active material particles, with respect to the total amount of the electronic conductor, is not less than 70% and not more than 100%.

The battery resistance lowering effect is particularly pronounced in such a configuration.

In a desired aspect of the positive electrode material for lithium secondary batteries disclosed herein, the positive electrode material contains both the lithium conductor and the electronic conductor.

A synergistic effect is achieved in such a configuration, and the battery resistance lowering effect is very pronounced.

In a desired aspect of the positive electrode material for lithium secondary batteries disclosed herein, the electronic conductor is a perovskite-type oxide represented by $ABO_{3-\delta}$ wherein A is a combination of La and at least one element selected from the group consisting of Ca, Sr and Ba; B is a combination of Co and at least one element selected from the group consisting of Mn and Ni; and $\delta$ is an oxygen deficiency value for achieving electrical neutrality.

The battery resistance lowering effect is particularly high in such a configuration.

The method for producing positive electrode material for lithium secondary batteries disclosed herein includes steps of: preparing positive electrode active material particles each having a layered structure, and at least one conductor selected from the group consisting of a lithium conductor having a negative charge and an electronic conductor having a positive charge; and mixing the positive electrode active material particles and the conductor.

Such a configuration allows producing efficiently the above positive electrode material for lithium secondary batteries, which affords a battery resistance lowering effect.

DESCRIPTION OF THE PREFERRED EMBODIMENTS

Embodiments of the present teaching will be explained next. Any features other than the matter specifically set forth in the present specification and that may be necessary for carrying out the teaching (for instance ordinary configurations of positive electrode materials for lithium secondary batteries not being characterizing features of the present teaching) can be regarded as instances of design matter for a person skilled in the art based on known art in the relevant technical field. The teaching can be realized on the basis of the disclosure of the present specification and common technical knowledge in the relevant technical field. In the drawings below, members and portions that elicit identical effects are denoted with identical reference symbols. The dimensional relationships (length, width, thickness and so forth) in the drawings do not reflect actual dimensional relationships.

The positive electrode material for lithium secondary batteries according to the present embodiment contains: positive electrode active material particles each having a layered structure; and at least one conductor selected from the group consisting of a lithium conductor and an electronic conductor, and disposed on a surface of the positive electrode active material particles. In a case where the positive electrode material according to the present embodiment contains the above lithium conductor, a proportion (b/a× 100) of the lithium conductor (b) disposed at planes other than the (003) plane of the positive electrode active material particle, with respect to a total amount (a) of the lithium conductor, is not less than 50% and not more than 100%. In a case where the positive electrode material contains the above electronic conductor, a proportion of the electronic conductor (d) disposed at the (003) plane of the positive electrode active material particle, with respect to a total amount (c) of the electronic conductor, is not less than 50% and not more than 100%

The positive electrode active material particles used in the positive electrode material according to the present embodiment have a layered crystal structure, and in a typical example are particles of a layered lithium-transition metal composite oxide.

The lithium-transition metal composite oxide contains lithium and one or two or more transition metal elements. Desirably, the lithium-transition metal composite oxide contains at least one from among Ni, Co and Mn as the transition metal element. Typical examples of the lithium-transition metal composite oxides include lithium-nickel composite oxides, lithium-cobalt composite oxides, lithium-nickel-manganese composite oxides, lithium-nickel-cobalt-manganese composite oxides, lithium-nickel-cobalt-aluminum composite oxides, lithium-iron-nickel-manganese composite oxides and the like.

In the present specification, the term "lithium-nickel-cobalt-manganese composite oxide" encompasses oxides having Li, Ni, Co, Mn and O as constituent elements, and oxides that contain one or two or more additive elements other than the foregoing constituent elements. Examples of such additive elements include for instance transition metal elements and typical metal elements such as Mg, Ca, Al, Ti, V, Cr, Si, Y, Zr, Nb, Mo, Hf, Ta, W, Na, Fe, Zn, Sn and the like. The additive element may be a metalloid element such as B, C, Si, P or the like, or a non-metallic element such as S, F, Cl, Br, I or the like. The same applies to the lithium-nickel composite oxides, lithium-cobalt composite oxides, lithium-nickel-manganese composite oxides, lithium-nickel-cobalt-aluminum composite oxides and lithium-iron-nickel-manganese composite oxides above.

The lithium-transition metal composite oxide desirably has a composition represented by Formula (I) below:

$$Li_{1+u}Ni_xCo_yMn_zM_tO_2 \quad (I)$$

In Formula (I), u, x, y, z and t satisfy $-0.1 \leq u \leq 0.5$, $0.3 \leq x \leq 0.9$, $0 \leq y \leq 0.55$, $0 \leq z \leq 0.55$, $0 \leq t \leq 0.1$ and $x+y+z+t=1$. Further, M is at least one element selected from the group consisting of Mg, Ca, Al, Ti, V, Cr, Si, Y, Zr, Nb, Mo, Hf, Ta and W.

Among the foregoing, x, y and z are desirably roughly identical (i.e. the composition ratios of Ni, Co and Mn are roughly identical). Specifically, there holds desirably $0.3 \leq x \leq 0.5$, $0.20 \leq y \leq 0.4$ and $0.20 \leq z \leq 0.4$. Further, there holds desirably $t=0$. In such a case, the lithium-transition metal composite oxide exhibits high energy density and excellent thermal stability. The effect of the present teaching can be brought out at a yet higher level as a result.

The positive electrode active material particles have a layered structure, and accordingly the (003) plane and planes other than the (003) plane (for instance the (101) plane, the (104) plane and the like) are present at the surface of the positive electrode active material particles. In the positive electrode active material particles each having a layered structure, lithium ions enter and leave basically at planes other than the (003) plane, without any traffic of lithium ions at the (003) plane.

The presence of a layered structure in the positive electrode active material particles can be checked in accordance with known methods. For instance the layered structure can be ascertained by X-ray diffraction measurement, and the like.

The average particle size (D50) of the positive electrode active material particles is not particularly limited, and is for instance not less than 0.05 μm and not more than 20 μm, desirably not less than 0.5 μm and not more than 15 μm, and more desirably not less than 1 μm and not more than 12 μm.

The average particle size of the positive electrode active material particles can be determined for instance by laser diffraction scattering or the like.

The positive electrode material according to the present embodiment contains at least one conductor selected from the group consisting of a lithium conductor and an electronic conductor, disposed on the surface of the positive electrode active material particles.

The lithium conductor is not particularly limited so long as it is a compound having lithium ion conductivity; and for instance an oxide having lithium ion conductivity can be used as the lithium conductor. Desired among the foregoing are lithium-ion conductive oxides containing at least one element selected from the group consisting of P, Nb, Si, Zr and W, examples of which include $Li_3PO_4$, $LiPO_3$, $LiNbO_3$, $Li_4SiO_4$, $Li_2Si_2O_3$, $LiZrO_3$, $Li_2WO_4$, $Li_4WO_5$ and $Li_6W_2O_9$. The lithium conductor can be used singly or in combinations of two or more types.

The electronic conductor is not particularly limited so long as it is a compound having electron conductivity, and for instance an oxide having electron conductivity can be used as the electronic conductor. Desired electronic conductors among the foregoing are perovskite-type oxides represented by formula $ABO_{3-\delta}$ (in the formula, A is at least one element selected from the group consisting of La, Ca, Sr and Ba; B is at least one element selected from the group consisting of Co, Mn, and Ni; δ is an oxygen deficiency value for achieving electrical neutrality), on account of the more pronounced effect brought out by these oxides. In the above $ABO_{3-\delta}$, desirably, A is a combination of La and at least one element selected from the group consisting of Ca, Sr and Ba, and B is a combination of Co and at least one element selected from the group consisting of Mn and Ni. Specifically, the electronic conductor is desirably an oxide represented by $La_{1-p}Ma_pCo_{1-q}Mb_qO_{3-\delta}$ (in the formula, Ma is at least one element selected from the group consisting of Ca, Sr and Ba; Mb is at least one element selected from the group consisting of Mn and Ni; p and q satisfy $0 \leq p < 1$ and $0 < q < 1$; p satisfies desirably $0 < p < 1$, and more desirably $0.3 \leq p \leq 0.7$; and δ is an oxygen deficiency value for achieving electrical neutrality). The electronic conductor can be used singly or in combinations of two or more types.

In a case where the positive electrode material according to the present embodiment contains the above lithium conductor, the proportion (b/a×100) of the lithium conductor (b) disposed at planes other than the (003) plane of the positive electrode active material particles, with respect to the total amount (a) of the lithium conductor, is not less than 50% and not more than 100%. (Specifically, the percentage of the amount of the lithium conductor disposed at planes other than the (003) plane with respect to the total of the amount of the lithium conductor disposed at planes other than the (003) plane plus the amount of the lithium conductor disposed at the (003) plane, is not less than 50% and not more than 100%.)

Such a configuration allows reducing the resistance of the lithium secondary battery. In addition, it becomes possible to enhance cycle characteristics and suppress rises in temperature during overcharge. Conceivable underlying reasons for these effects include the following.

In the above configuration, a large amount of the lithium conductor is disposed at planes other than the (003) plane, being planes at which lithium ions enter and leave. As a result, there can be promoted insertion of lithium ions into the positive electrode active material particles, and desorption of lithium ions from the positive electrode active material particles. Thanks to a reduction in the abundance ratio of the lithium conductor at the (003) plane, it becomes possible to suppress increases in electronic resistance derived from high insulating character thereof. This allows reducing as a result the resistance of the lithium secondary battery.

Further, by arranging the lithium conductor on the surface of the positive electrode active material particles, it becomes moreover possible to suppress side reactions between the positive electrode active material and acids or the like in an electrolyte solution. Thanks to their good mobility of ions, lithium ions can be extracted even when it is difficult to maintain discharge capacity due for instance to side reactions and/or film formation during charge and discharge cycles. The cycle characteristics of the lithium secondary battery can be enhanced as a result.

Furthermore, the reaction surface area where reaction occurs between the electrolyte solution and the positive electrode active material during overcharge is reduced by arranging the lithium conductor at the surface of the positive electrode active material particles, and side reactions can be suppressed as a result. The lithium conductor is present at planes of lithium traffic, and as a result it becomes possible to mitigate the overcharge state (to substantially reduce the SOC), through supply of lithium from the lithium conductor to the positive electrode active material, at the time of destabilization derived from withdrawal of lithium from the positive electrode active material during overcharge. This allows suppressing rises in temperature at the time of overcharge of the lithium secondary battery.

The proportion (b/a×100) of the amount (b) with respect to the total amount (a) is desirably not less than 70% and not more than 100%, and more desirably not less than 80% and not more than 100l %, since in that case the effect that is achieved is more pronounced.

In conventional art the proportion (b/a×100) of the amount (b) with respect to the total amount (a) is about 30% to 45%.

In a case where the positive electrode material according to the present embodiment contains the electronic conductor, the proportion (d/c×100) of the electronic conductor (d) disposed at the (003) plane of the positive electrode active material particles, with respect to the total amount (c) of the electronic conductor, is not less than 50% and not more than 100%. (Specifically, the percentage of the amount of the electronic conductor disposed at the (003) plane with respect to the total of the amount of the electronic conductor disposed at planes other than the (003) plane, plus the amount of the electronic conductor disposed at the (003) plane, is not less than 50% and not more than 100%.)

Such a configuration allows reducing the resistance of the lithium secondary battery. In addition, it becomes possible to enhance cycle characteristics and suppress rises in temperature during overcharge. Conceivable underlying reasons for these effects include the following.

The electronic conductor is selectively present at the (003) plane, at which lithium ions do not enter or leave; as a result it becomes possible to efficiently utilize, for electron exchange, reaction surfaces that are not involved in lithium traffic. Further, a drop in the abundance ratio of the electronic conductor at planes other than the (003) plane allows suppressing decreases in the reaction surface area for de-insertion of lithium. The resistance of the lithium secondary battery can be reduced as a result.

In addition, since the electronic conductor is disposed on the surface of the positive electrode active material particles, it becomes moreover possible as a result to suppress cutoff of electron conduction paths caused by expansion and contraction of the positive electrode active material which occur during charge and discharge cycles. The cycle characteristics of the lithium secondary battery can be enhanced as a result.

Furthermore, the fact that the electronic conductor is disposed on the surface of the positive electrode active material particles allows increasing electronic resistance at the time of rises in temperature during overcharge, and allows thereby further suppressing rises in temperature. By virtue of the fact that the electronic conductor is present selectively at the (003) plane, at which lithium ions do not enter or leave, supply of electrons necessary for mitigating the overcharge state (substantially reducing the SOC) can take place appropriately and reactions among primary particles can progress uniformly without unevenness. This allows suppressing rises in temperature at the time of overcharge of the lithium secondary battery.

The proportion (d/c×100) of the amount (d) with respect to the total amount (c) is desirably not less than 70% and not more than 100%, and more desirably not less than 80% and not more than 100%, since in that case there is achieved yet more pronounced effect.

In conventional art, the proportion (d/c×100) of the amount (d) with respect to the total amount (c) is about 30% to 45%.

The positive electrode material according to the present embodiment desirably contains the lithium conductor from among the lithium conductor and the electronic conductor, and more desirably contains both the lithium conductor and the electronic conductor.

By containing both the lithium conductor and the electronic conductor, an effect can be achieved that is more pronounced than the sum of the effect elicited in a case where the positive electrode material according to the present embodiment contains the lithium conductor alone and the effect elicited in a case where the positive electrode material according to the present embodiment contains the electronic conductor alone. In the above case, specifically, a synergistic effect allows significantly lowering resistance of the lithium secondary battery, noticeably improving the cycle characteristics, and greatly suppressing rises in temperature during overcharge. Conceivable underlying reasons for these effects include the following.

In a case where the positive electrode material contains the lithium conductor alone, a trade-off arises in that the presence of the lithium conductor at planes other than the (003) plane, being planes at which lithium ions enter and leave, results in a significant improvement of characteristics, whereas the presence of the lithium conductor at the (003) plane, at which lithium ions do not enter or leave, results in a drop in characteristics (for instance resistance increases at the portions involved).

In a case where the positive electrode material contains the electronic conductor alone, a trade-off arises likewise in that the presence of the electronic conductor at the (003) plane, at which lithium ions do not enter or leave, results in a significant improvement of characteristics, whereas the presence of the electronic conductor at planes other than the (003) plane, being planes at which lithium ions enter and leave, results in a drop in characteristics (for instance inhibition of lithium ion de-insertion at the portions involved).

In a case however where the positive electrode material according to the present embodiment contains both the lithium conductor and the electronic conductor, the lithium conductor is present in a large amount at planes other than the (003) plane, being planes at which lithium ions enter and leave, and the electronic conductor is present in a large amount of at the (003) plane, at which lithium ions do not enter or leave; as a result, it becomes possible to achieve the effect elicited by arranging a large amount of lithium conductor at planes other than the (003) plane, and the effect elicited by arranging a large amount of electronic conductor at the (003) plane, which in turn allows achieving an effect brought about through canceling thus the above trade-offs.

An explanation follows next on an example of a method for identifying the positive electrode material according to the present embodiment. The method for identifying the positive electrode material according to the present embodiment is not particularly limited to the method below.

Firstly, X-ray diffraction (XRD) measurement of the positive electrode material is performed, and the peaks derived from the positive electrode active material and derived from the conductors are separated, to thereby grasp crystal structures.

Energy dispersive X-ray spectroscopy and electron energy loss spectroscopy using a scanning transmission electron microscope (STEM-EDX/EELS) are performed on a cross-section of the positive electrode material, and arbitrary points are subjected to composition analysis, to thereby determine the compositions of the positive electrode active material and of the conductors. Alternatively, the compositions of the positive electrode active material and of the conductors are ascertained on the basis of element ratios obtained from an inductively coupled plasma (ICP) analysis of the positive electrode material.

The cross-section of the positive electrode material is observed by STEM, electron beam diffraction is carried out, and the crystal orientation of target primary particles is measured, to ascertain the orientation of crystal planes at the surface of the positive electrode active material particles.

The amounts of the conductors are determined on the basis of Rietveld analysis of the peaks derived from the positive electrode active material and peaks derived from the conductors, obtained in the XRD measurement of the positive electrode material, or on the basis of the element ratios obtained by ICP analysis.

A method for producing the positive electrode material according to the present embodiment will be explained next. The positive electrode material according to the present embodiment can be desirably produced in accordance with a production method that includes a step (preparation step) of preparing positive electrode active material particles each having a layered structure, and at least one conductor selected from the group consisting of lithium conductors having a negative charge and electronic conductor having a positive charge; and a step (mixing step) of mixing the positive electrode active material particles and the conductor. The method for producing the positive electrode material according to the present embodiment is however not limited to the above method.

The preparation step will be explained first.

Positive electrode active material particles each having a layered structure can be produced in accordance with a known method.

As the conductor there is prepared a conductor having a charge (conductor having a charge which has been imparted thereto).

The lithium conductor having a negative charge can be produced for instance by causing a compound having a negative charge to become adhered to a lithium conductor.

The type of the compound having a negative charge is not particularly limited, so long as the compound has a negative charge and can become adhered (by adsorption or bonding) to the surface of the lithium conductor. Desired examples of compounds having a negative charge include anionic surfactants. Examples of anionic surfactants include alkyl sulfate ester salts (for example sodium dodecyl sulfate, ammonium dodecyl sulfate and the like), polyoxyethylene alkyl sulfate ester salts, sodium dodecylbenzenesulfonate, sodium dialkyl sulfosuccinate, ammonium polyoxy alkylene alkenyl ether sulfates, fatty acid salts, and a sodium salt of a naphthalenesulfonic acid-formalin condensate. Desired among the foregoing are alkyl sulfate ester salts.

Adhesion of the compound having a negative charge onto the lithium conductor can be accomplished for instance by dispersing the lithium conductor in a solution of the compound having a negative charge, and then taking out the lithium conductor from the solution, followed by drying.

Alternatively, the lithium conductor having a negative charge can be produced by subjecting the surface of the lithium conductor to a surface treatment such that anionic groups are introduced at the surface (for instance a plasma treatment or UV treatment).

The electronic conductor having a positive charge can be produced for instance by causing a compound having a positive charge to become adhered to the electronic conductor.

The type of the compound having a positive charge is not particularly limited, so long as the compound has a positive charge and can become adhered (by adsorption or bonding) to the surface of the electronic conductor. Desired examples of the compound having a positive charge include cationic surfactants. Examples of cationic surfactants include alkylamine salts such as coconut amine acetate, stearylamine acetate and the like; alkyldimethyl ammonium salts; alkylbenzyldimethyl ammonium salts; alkyltrimethyl ammonium salts such as lauryltrimethyl ammonium chloride, stearyltrimethyl ammonium chloride, cetyltrimethyl ammonium chloride, cetyltrimethyl ammonium bromide, alkylbenzyldimethyl ammonium chlorides and the like. Desired among the foregoing are alkytrimethyl ammonium salts.

Adhesion of the compound having a positive charge onto the electronic conductor can be accomplished for instance by dispersing the electronic conductor in a solution of the compound having a positive charge, and then taking out the electronic conductor from the solution, followed by drying.

Alternatively, the electronic conductor having a positive charge can be produced by subjecting the surface of the electronic conductor to a surface treatment such that cationic groups are introduced at the surface.

The mixing step will be explained next. The mixing step can be accomplished for instance by dispersing uniformly the positive electrode active material particles and the conductor having a charge in a dispersion medium, and taking out them from the dispersion medium, followed by drying.

After drying, a thermal treatment or the like may be further carried out, to thereby remove the compound having a positive charge and the compound having a negative charge.

In a case where both a lithium conductor having a negative charge and an electronic conductor having a positive charge are used as the conductor, then both the lithium conductor having a negative charge and the electronic conductor having a positive charge may be mixed with the positive electrode active material particles simultaneously. One from among the lithium conductor having a negative charge and the electronic conductor having a positive charge may be mixed with the positive electrode active material particles, to be disposed on the surface of the positive electrode active material particles, after which the other from among the lithium conductor having a negative charge and the electronic conductor having a positive charge may be mixed with the resulting positive electrode active material particles. Desirably, the lithium conductor having a negative charge is mixed with the positive electrode active material particles, to thereby arrange the lithium conductor on the surface of the positive electrode active material particles, after which the electronic conductor having a positive charge is mixed with the resulting positive electrode active material particles, to thereby arrange the electronic conductor on the surface of the positive electrode active material particles.

Oxygen atoms are arrayed at the (003) plane, and accordingly the (003) plane is negatively charged. By contrast, metal atoms are arrayed at planes other than the (003) plane, and accordingly the planes have electrical neutrality or are positively charged. Given that the lithium conductor has a negative charge, the above method allows therefore the lithium conductor to be selectively disposed at planes other than the (003) plane on the surface of the positive electrode active material particles, and allows bringing the proportion (b/a×100) of the amount (b) with respect to the total amount (a) to 50% or higher. Since the electronic conductor has a positive charge, moreover, the electronic conductor can be selectively disposed at the (003) plane on the surface of the positive electrode active material particles, and it becomes possible to bring the proportion (d/c×100) of the amount (d) with respect to the total amount (c) to 50% or higher. (In conventional art, where a negative charge is not imparted to a lithium conductor, the proportion (b/a×100) of the amount (b) with respect to the total amount (a) is about 30% to 45%. In conventional art, where a positive charge is not imparted to an electronic conductor, the proportion (d/c×100) of the amount (d) with respect to the total amount (c) is about 30% to 45%.)

Therefore, the above production method allows producing efficiently the positive electrode material according to the present embodiment.

The proportion (b/a×100) of the amount (b) with respect to the total amount (a) can be adjusted by adjusting the amount of a negative charge that is imparted (for instance, by modifying the coverage of the compound having a negative charge on the lithium conductor). Similarly, the proportion (d/c×100) of the amount (d) with respect to the total amount (c) can be adjusted by adjusting the amount of a positive charge that is imparted (for instance, by modifying the coverage of the compound having a positive charge on the electronic conductor).

The positive electrode material according to the present embodiment is used for lithium secondary batteries. A lithium secondary battery can be constructed herein in accordance with a known method, using the positive electrode material according to the present embodiment. A concrete configuration example of a lithium secondary battery that utilizes the positive electrode material according to the present embodiment will be explained next with reference to accompanying drawings.

In the present specification the term "secondary battery" denotes an electric storage device in general that is capable of being charged and discharged repeatedly, and encompasses so-called storage batteries and electric storage elements such as electrical double layer capacitors.

Figure 1:
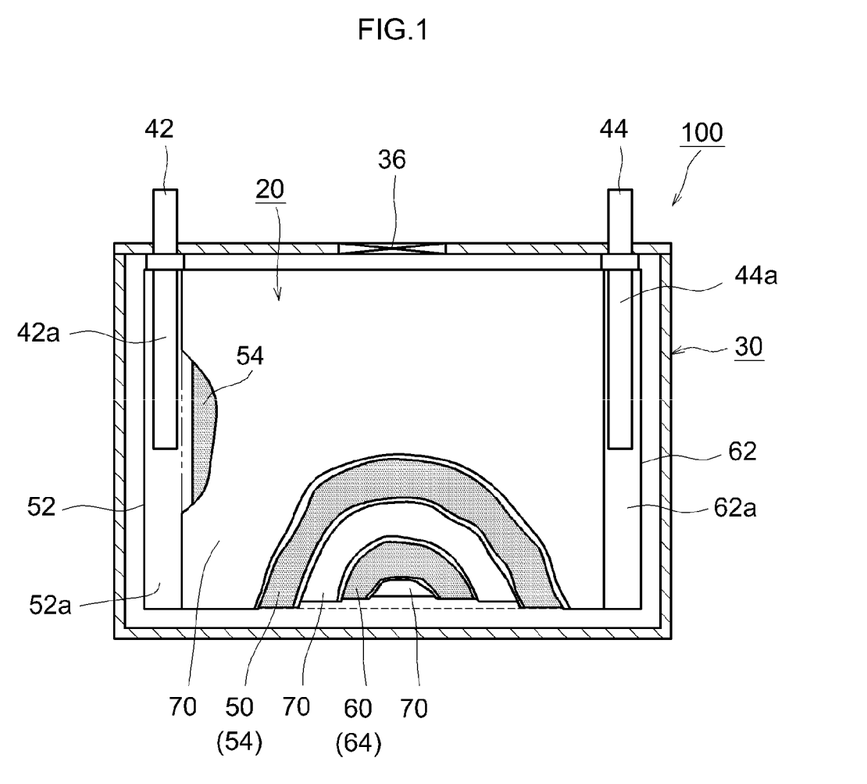
FIG. 1 is a cross-sectional diagram illustrating schematically the configuration of a lithium secondary battery constructed using a positive electrode material according to an embodiment of the present teaching.

A lithium secondary battery 100 illustrated in FIG. 1 is a sealed-type lithium secondary battery 100 constructed in such a manner that a flat wound electrode body 20 and a nonaqueous electrolyte (not shown) are accommodated in a flat square battery case (i.e. outer container) 30. The battery case 30 is provided with a positive electrode terminal 42 and a negative electrode terminal 44 for external connection, and with a thin-walled safety valve 36 configured so as to release internal pressure in the battery case 30 when the internal pressure rises to a predetermined level or above. The positive and negative electrode terminals 42, 44 are electrically connected to positive and negative electrode collector plates 42a, 44a, respectively. For instance a lightweight metallic material of good thermal conductivity, such as aluminum, is used as the material of the battery case 30.

Figure 2:
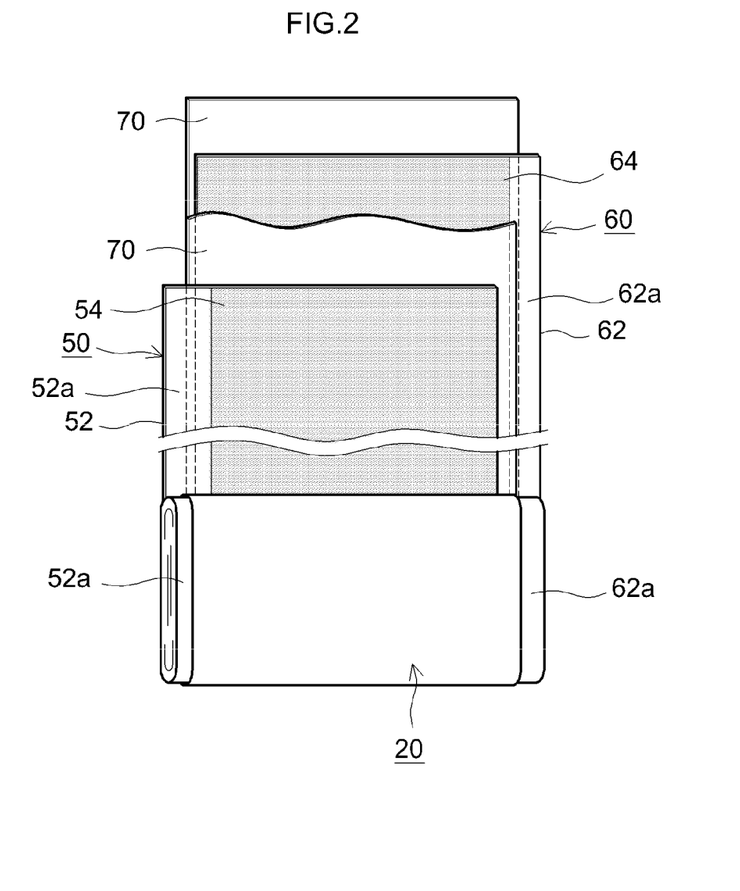
FIG. 2 is a schematic diagram illustrating the configuration of a wound electrode body of a lithium secondary battery constructed using a positive electrode material according to an embodiment of the present teaching.

As illustrated in FIG. 1 and FIG. 2, the wound electrode body 20 results from laminating a positive electrode sheet 50 in which a positive electrode active material layer 54 is formed along the longitudinal direction, on one or both faces (herein both faces) of an elongated positive electrode collector 52, and a negative electrode sheet 60 in which a negative electrode active material layer 64 is formed along the longitudinal direction, on one face or both faces (herein both faces) of an elongated negative electrode collector 62, with two elongated separator sheets 70 interposed in between, and from winding then the resulting stack in the longitudinal direction. The positive electrode collector plate 42a and the negative electrode collector plate 44a are respectively joined to a positive electrode active material layer non-formation portion 52a (i.e. exposed portion of the positive electrode collector 52 at which the positive electrode active material layer 54 is not formed) and a negative electrode active material layer non-formation portion 62a (i.e. exposed portion of the negative electrode collector 62 at which the negative electrode active material layer 64 is not formed) that are formed so as to protrude outward from both edges of the wound electrode body 20 in the winding axis direction thereof (sheet width direction perpendicular to the longitudinal direction).

For instance an aluminum foil can be used as the positive electrode collector 52 that makes up the positive electrode sheet 50. The positive electrode active material layer 54 contains the above-described positive electrode material according to the present embodiment, being a material containing a positive electrode active material. The positive electrode active material layer 54 can further contain for instance a conductive material, a binder and the like. As the conductive material there can be suitably used for instance carbon black such as acetylene black (AB) or other carbon materials (for example graphite or the like). For instance polyvinylidene fluoride (PVDF) or the like can be used as the binder.

For instance a copper foil or the like can be used as the negative electrode collector 62 that makes up the negative electrode sheet 60. The negative electrode active material layer 64 contains a negative electrode active material. A carbon material such as graphite, hard carbon, soft carbon or the like can be used as the negative electrode active material. The negative electrode active material layer 64 can further contain a binder, a thickener and the like. For instance styrene butadiene rubber (SBR) or the like can be used as the binder. For instance carboxymethyl cellulose (CMC) or the like can be used as the thickener.

Various kinds of microporous sheet identical to those conventionally utilized in lithium secondary batteries can be used herein as the separator 70. Examples of microporous sheets include microporous resin sheets made up of a resin such as polyethylene (PE) or polypropylene (PP). The microporous resin sheet may have a single-layer structure or may have a multilayer structure of two or more layers (for instance a three-layer structure in which a PP layer is laid up on both faces of a PE layer). The separator 70 may be provided with a heat-resistant layer (HRL).

An electrolyte the same as or similar to those of conventional lithium secondary batteries can be used as the nonaqueous electrolyte. Typically a nonaqueous electrolyte can be used that contains a supporting salt in an organic solvent (nonaqueous solvent). Examples of the nonaqueous solvent include for instance an aprotic solvent such as a carbonate, an ester, an ether or the like. Among the foregoing there can be desirably used carbonates, for instance ethylene carbonate (EC), diethyl carbonate (DEC), dimethyl carbonate (DMC), ethyl methyl carbonate (EMC) or the like. Alternatively, there can be desirably used a fluorine-based solvent such as a fluorinated carbonate, for instance monofluoroethylene carbonate (MFEC), difluoroethylene carbonate (DFEC), monofluoromethyl difluoromethyl carbonate (F-DMC), trifluorodimethyl carbonate (TFDMC) and the like. Such nonaqueous solvents can be used singly or in combinations of two or more types. For instance a lithium salt such as $LiPF_6$, $LiBF_4$, $LiClO_4$ or the like can be used as the supporting salt. The concentration of the supporting salt is desirably 0.7 mol/L to 1.3 mol/L.

So long as the effect of the present teaching is not significantly impaired thereby, the above nonaqueous electrolyte can contain components other than the nonaqueous solvent and supporting salt described above, for instance various additives such as gas generating agents, film-forming agents, dispersants, thickeners and the like.

The lithium secondary battery 100 can be used for various applications. Desired applications include driving power sources for vehicles such as plug-in hybrid vehicles (PHV), hybrid vehicles (HIV) and electric vehicles (EV). The lithium secondary battery 100 can be used in the form of a battery pack resulting from electrically connecting a plurality of batteries.

A square lithium secondary battery having a flat wound electrode body has been explained above as an example. However, the positive electrode material according to the present embodiment can also be used in other types of lithium secondary battery, in accordance with known methods. For instance, a lithium secondary battery provided with a stacked type electrode body can be constructed using the positive electrode material according to the present embodiment. Further, a cylindrical lithium secondary battery, a laminate-type lithium secondary battery or the like can likewise be constructed using the positive electrode material according to the present embodiment. An all-solid secondary battery can also be constructed using the positive electrode material according to the present embodiment.

Examples pertaining to the present teaching will be explained next, but the present teaching is not meant to be limited to these examples.

Production of Positive Electrode Materials A1 to A28

Preparation of Positive Electrode Active Material

Positive electrode active materials having the compositions given in Table 1 and Table 2 were produced in accordance with ordinary methods.

Specifically, when $LiNi_{0.4}Co_{0.3}Mn_{0.3}O_2$ particles each having a layered structure were produced, sulfates of Ni, Co and Mn were dissolved in water so that a molar ratio of Ni, Co and Mn of 0.4:0.3:0.3 was obtained. Then NaOH was added to the resulting solution, to thereby precipitate a composite hydroxide containing Ni, Co and Mn, as a precursor of a positive electrode active material. The obtained composite hydroxide and lithium carbonate were mixed so that a molar ratio of 1:1 was obtained. The resulting mixture was fired at 900° C. for 15 hours, to yield $LiNi_{0.4}Co_{0.3}Mn_{0.3}O_2$ particles each having a layered structure. The obtained $LiNi_{0.4}Co_{0.3}Mn_{0.3}O_2$ particles had an average particle size of 10 μm.

Other positive electrode active material particles given in the tables were produced in accordance with the same method as above.

Preparation of Lithium Conductors

First, 10 g of $Li_3PO_4$ particles as a lithium conductor were suspended in 100 g of water in which 0.1 g of sodium dodecyl sulfate (SDS) was dissolved, and the resulting suspension was stirred for 30 minutes at room temperature. A powder was recovered by suction filtration, and was dried, to thereby yield $Li_3PO_4$ particles having a negative charge. The amount of SDS used was changed, to produce $Li_3PO_4$ particles having different degrees of negative charging.

Lithium conductors having a negative charge and having the compositions given in Table 1 and Table 2 were produced in the same way as above.

Preparation of Electronic Conductors

First, 10 g of $LaNi_{0.4}Co_{0.3}Mn_{0.3}O_3$ particles as an electronic conductor were suspended in 100 g of water in which 0.1 g of cetyltrimethyl ammonium bromide (CTAB) was dissolved, and the resulting suspension was stirred for 30 minutes at room temperature. A powder was recovered by suction filtration, and was dried, to thereby yield $LaNi_{0.4}Co_{0.3}Mn_{0.3}O_3$ particles having a positive charge. The amount of CTAB used was changed, to produce $LaNi_{0.4}Co_{0.3}Mn_{0.3}O_3$ particles having different degrees of positive charging.

Electronic conductors having a positive charge and having the compositions given in Table 1 and Table 2 were produced in the same way as above.

Production of Positive Electrode Materials

Positive Electrode Materials A1 to A4

Suspensions of positive electrode active material particles were produced, using 100 mL of water containing a lithium conductor in the weight proportions given in Table 1, with respect to 10 g of positive electrode active material particles ($LiNi_{0.4}Co_{0.3}Mn_{0.3}O_2$ particles). Each suspension was stirred for 60 minutes at room temperature. A powder was recovered by filtration, and was dried thereafter. The dried product was subjected to a thermal treatment at 400° C. for 1 hour, to thereby remove SDS and yield a respective positive electrode material.

Positive Electrode Materials A5 to A8

Suspensions of positive electrode active material particles were produced, using 100 mL of water containing an electronic conductor in the weight proportions given in Table 1, with respect to 10 g of positive electrode active material particles ($LiNi_{0.4}Co_{0.3}Mn_{0.3}O_2$ particles). Each suspension was stirred for 60 minutes at room temperature. A powder was recovered by filtration, and was dried thereafter. The dried product was subjected to a thermal treatment at 400° C. for 1 hour, to thereby remove CTAB and yield a respective positive electrode material.

Positive Electrode Materials A9 to A28

Suspensions of positive electrode active material particles were produced, using 100 mL of water containing a lithium conductor having a negative charge, in the weight proportions given in Table 1 and Table 2, with respect to 10 g of positive electrode active material particles given in Table 1 and Table 2. Each suspension was stirred for 60 minutes at room temperature. A powder was recovered by filtration, and was dried thereafter. The dried product was subjected to a thermal treatment for 1 hour at 400° C., to thereby remove SDS. Next, suspensions of positive electrode active material particles having a lithium conductor adhered thereto were produced, using 100 mL of water containing an electronic conductor having a positive charge at the weight proportions given in Table 1 and Table 2, with respect to 10 g of positive electrode active material particles. Each suspension was stirred for 60 minutes at room temperature. A powder was recovered by filtration, and was dried thereafter. The dried product was subjected to a thermal treatment at 400° C. for 1 hour, to thereby remove CTAB and yield a respective positive electrode material.

Production of Positive Electrode Materials B1 and B2

$Li_3PO_4$ particles having a positive charge were obtained in accordance with the same method as above, but using CTAB instead of SDS.

Respective positive electrode materials were produced, in accordance with the same method as above, using these $Li_3PO_4$ particles having a positive charge and $LiNi_{0.4}Co_{0.3}Mn_{0.3}O_2$ particles.

Production of Positive Electrode Material B3

A positive electrode material was produced in accordance with the same method as above, using herein $Li_3PO_4$ particles which had not been treated with SDS or CTAB (i.e. $Li_3PO_4$ particles to which no charge had been imparted), and $LiNi_{0.4}Co_{0.3}Mn_{0.3}O_2$ particles.

Production of Positive Electrode Materials B4 and B5

$LaNi_{0.4}Co_{0.3}Mn_{0.3}O_3$ particles having a negative charge were obtained in accordance with the same method as described above, but using SDS instead of CTAB.

Respective positive electrode materials were produced, in accordance with the same method as above, using these $LaNi_{0.4}Co_{0.3}Mn_{0.3}O_3$ particles having a negative charge and $LiNi_{0.4}Co_{0.3}Mn_{0.3}O_2$ particles.

Production of Positive Electrode Material B6

A positive electrode material was produced in accordance with the same method as above, using herein $LaNi_{0.4}Co_{0.3}Mn_{0.3}O_3$ particles which had not been treated with SDS or CTAB (i.e. $LaNi_{0.4}Co_{0.3}Mn_{0.3}O_3$ particles to which no charge had been imparted), and $LiNi_{0.4}Co_{0.3}Mn_{0.3}O_2$ particles.

Production of Positive Electrode Materials B7 and B9

Herein $Li_3PO_4$ particles having a positive charge were obtained in accordance with the same method as above, but using CTAB instead of SDS.

Herein $LaNi_{0.4}Co_{0.3}Mn_{0.3}O_3$ particles having a negative charge were obtained in accordance with the same method as described above, but using SDS instead of CTAB.

Respective positive electrode materials were produced, in accordance with the same method as above, using the $Li_3PO_4$ particles having a positive charge, the $LaNi_{0.4}Co_{0.3}Mn_{0.3}O_3$ particles having a negative charge, and $LiNi_{0.4}Co_{0.3}Mn_{0.3}O_2$ particles.

Production of Positive Electrode Material B8

A positive electrode material was produced in accordance with the same method as above, using herein $Li_3PO_4$ particles and $LaNi_{0.4}Co_{0.3}Mn_{0.3}O_3$ particles which had not been treated with SDS or CTAB (i.e. $Li_3PO_4$ particles and $LaNi_{0.4}Co_{0.3}Mn_{0.3}O_3$ particles to which no charge had been imparted), and $LiNi_{0.4}Co_{0.3}Mn_{0.3}O_2$ particles.

Evaluation of the Positive Electrode Materials

The crystal structure of the positive electrode active materials produced above was ascertained to be a layered structure through XRD measurement. Further, analyses by XRD and STEM-EXD/EESL were performed to determine the proportion (b/a×100) of lithium conductor (b) disposed at planes other than the (003) plane of the positive electrode active material particles with respect to the total amount (a) of the lithium conductor in the positive electrode material, and the proportion (d/c×100) of the electronic conductor (d) disposed at the (003) plane of the positive electrode active material particles with respect to the total amount (c) of the electronic conductor in the positive electrode material. The results are given in Table 1 and Table 2.

Production of Lithium Secondary Batteries for Evaluation

Each positive electrode material produced above, acetylene black (AB) as a conductive material and polyvinylidene fluoride (PVDF) as a binder, were mixed in N-methyl pyrrolidone (NMP) using a planetary mixer, at a mass ratio of positive electrode material:AB:PVDF=84:12:4, to thereby prepare a respective slurry for positive electrode active material layer formation, having a solids concentration of 50 wt %. A respective positive electrode sheet was produced by coating both faces of an aluminum foil with the slurry, using a die coater, and by drying and thereafter pressing the resultant.

Further, natural graphite (C) as a negative electrode active material, styrene butadiene rubber (SBR) as a binder and carboxymethyl cellulose (CMC) as a thickener were mixed in deionized water, at a mass ratio of C:SBR:CMC=98:1:1, to thereby prepare a slurry for negative electrode active material layer formation. A negative electrode sheet was produced by coating both faces of a copper foil with the slurry, and by drying and thereafter pressing the resultant.

Two separator sheets (porous polyolefin sheets) were then prepared.

Each produced positive electrode sheet, negative electrode sheet and the two prepared separator sheets were overlaid on each other and were wound, to thereby produce a wound electrode body. Respective electrode terminals were attached, by welding, to the positive electrode sheet and negative electrode sheet of each produced wound electrode body, and the resultant was accommodated inside a battery case having a filling port.

Next, a nonaqueous electrolyte solution was injected through the filling port of the battery case, and the filling port was sealed hermetically. As the nonaqueous electrolyte solution, there was used a solution resulting from dissolving $LiPF_6$ as a supporting salt, to a concentration of 1.0 mol/L, in a mixed solvent that contained ethylene carbonate (EC), ethyl methyl carbonate (EMC) and dimethyl carbonate (DMC) at a volume ratio of 1:1:1.

Activation and Initial Capacity Measurement

Each produced lithium secondary battery for evaluation was placed in an environment at 25° C. Activation (first charging) was carried out in accordance with a constant current-constant voltage scheme that involved charging the lithium secondary battery for evaluation at constant current up to 4.2 V, at a current value of ⅓ C, followed by charging at constant voltage up to a current value of 1/50 C, to bring about a fully charged state. Thereafter, the lithium secondary battery for evaluation was discharged at constant current down to 3.0 V, at a current value of ⅓ C. The discharge capacity at that time was measured, to determine the initial capacity.

Measurement of Battery Resistance

Each activated lithium secondary battery for evaluation was adjusted to a SOC (state of charge) of 60%, and thereafter was placed in an environment at 25° C. The battery was discharged for 10 seconds at a current value of 20 C, and the voltage value after 10 seconds from start of discharge was measured, to calculate battery resistance. A ratio of resistance of other lithium secondary batteries for evaluation was determined with respect to 100 as the resistance of the lithium secondary battery for evaluation in which positive electrode material B1 was utilized. The results are shown in Table 1 and Table 2.

Evaluation of High-Temperature Cycle Characteristics

Each activated lithium secondary battery for evaluation was placed in an environment at 60° C. and was subjected to 500 repeated cycles of charge and discharge, each cycle involving constant-current charging at 2 C up to 4.2 V and constant-current discharge at 2 C down to 3.0 V. The discharge capacity at the 500-th cycle was determined in accordance with the same method as that of initial capacity. Then a capacity retention rate (%), as an indicator of high-temperature cycle characteristics, was determined as (discharge capacity at 500-th cycle of charge and discharge/initial capacity)×100. The results are shown in Table 1 and Table 2.

Measurement of Battery Temperature During Overcharge

A thermocouple was attached to the central portion of the battery case side face of each activated lithium secondary battery for evaluation. The lithium secondary battery for evaluation was charged to 4.1 V (SOC 100%), and was further charged up to an overcharge state (4.8 V). After voltage had reached 4.8 V, the battery was allowed to stand for 5 minutes, and the surface temperature at the central portion of the side face of the lithium secondary battery for evaluation was measured using the thermocouple. The results are shown in Table 1 and Table 2.

TABLE 1

| Positive electrode material | Positive electrode active material Composition formula | Lithium conductor Composition formula | Amount (wt %) | b/a (%) | Electronic conductor Composition formula | Amount (wt %) | d/c (%) | Battery resistance ratio | Capacity retention rate (%) | Temperature rise during overcharge (° C.) |
|---|---|---|---|---|---|---|---|---|---|---|
| B1 | $LiNi_{0.4}Co_{0.3}Mn_{0.3}O_2$ | $Li_3PO_4$ | 1 | 10 | — | 0 | 0 | 100 | 49 | 180 |
| B2 | | | 1 | 30 | | 0 | 0 | 94 | 54 | 175 |
| B3 | | | 1 | 35 | | 0 | 0 | 93 | 55 | 170 |
| A1 | | | 1 | 50 | | 0 | 0 | 69 | 62 | 99 |
| A2 | | | 1 | 60 | | 0 | 0 | 68 | 60 | 97 |
| A3 | | | 1 | 70 | | 0 | 0 | 60 | 70 | 90 |
| A4 | | | 1 | 75 | | 0 | 0 | 56 | 72 | 87 |
| B4 | | — | 0 | 0 | $LaNi_{0.4}Co_{0.3}Mn_{0.3}O_3$ | 1 | 10 | 99 | 48 | 180 |
| B5 | | | 0 | 0 | | 1 | 30 | 96 | 53 | 177 |
| B6 | | | 0 | 0 | | 1 | 37 | 94 | 53 | 175 |
| A5 | | | 0 | 0 | | 1 | 50 | 75 | 58 | 160 |
| A6 | | | 0 | 0 | | 1 | 60 | 73 | 60 | 145 |
| A7 | | | 0 | 0 | | 1 | 70 | 66 | 66 | 133 |
| A8 | | | 0 | 0 | | 1 | 75 | 63 | 70 | 120 |
| B7 | | $Li_3PO_4$ | 0.5 | 30 | | 0.5 | 30 | 91 | 58 | 160 |
| B8 | | | 0.5 | 35 | | 0.5 | 35 | 87 | 55 | 150 |
| A9 | | | 0.5 | 50 | | 0.5 | 50 | 52 | 82 | 67 |
| A10 | | | 0.5 | 60 | | 0.5 | 60 | 49 | 84 | 50 |
| A11 | | | 0.5 | 70 | | 0.5 | 70 | 40 | 90 | 32 |
| A12 | | | 0.5 | 75 | | 0.5 | 75 | 38 | 92 | 25 |
| B9 | | | 1 | 30 | | 1 | 30 | 80 | 60 | 150 |
| A13 | | | 1 | 50 | | 1 | 50 | 42 | 85 | 37 |
| A14 | | | 1 | 60 | | 1 | 60 | 39 | 90 | 22 |
| A15 | | | 1 | 70 | | 1 | 70 | 31 | 94 | 10 |
| A16 | | | 1 | 75 | | 1 | 75 | 27 | 97 | 8 |

TABLE 2

| Positive electrode material | Positive electrode active material Composition formula | Lithium conductor Composition formula | Amount (wt %) | b/a (%) | Electronic conductor Composition formula | Amount (wt %) | d/c (%) | Battery resistance ratio | Capacity retention rate (%) | Temperature rise during overcharge (° C.) |
|---|---|---|---|---|---|---|---|---|---|---|
| A17 | $LiNi_{0.4}Co_{0.3}Mn_{0.3}O_2$ | $LiNbO_3$ | 1 | 60 | $LaNi_{0.4}Co_{0.3}Mn_{0.3}O_3$ | 1 | 60 | 44 | 84 | 15 |
| A18 | | $Li_4SiO_4$ | 1 | 60 | | 1 | 60 | 40 | 86 | 26 |
| A19 | | $LiZrO_3$ | 1 | 60 | | 1 | 60 | 49 | 80 | 30 |

TABLE 2-continued

| Positive electrode material | Positive electrode active material Composition formula | Lithium conductor Composition formula | Amount (wt %) | b/a (%) | Electronic conductor Composition formula | Amount (wt %) | d/c (%) | Battery resistance ratio | Capacity retention rate (%) | Temperature rise during overcharge (° C.) |
|---|---|---|---|---|---|---|---|---|---|---|
| A20 |  | $Li_2WO_4$ | 1 | 60 |  | 1 | 60 | 49 | 84 | 33 |
| A21 | $LiNi_{0.5}Co_{0.2}Mn_{0.3}O_2$ | $Li_3PO_4$ | 1 | 60 | $LaNi_{0.5}Co_{0.2}Mn_{0.3}O_3$ | 1 | 60 | 45 | 80 | 30 |
| A22 | $LiNi_{0.6}Co_{0.2}Mn_{0.2}O_2$ |  | 1 | 60 | $LaNi_{0.6}Co_{0.2}Mn_{0.2}O_3$ | 1 | 60 | 52 | 76 | 42 |
| A23 | $LiNi_{0.8}Co_{0.1}Mn_{0.1}O_2$ |  | 1 | 60 | $LaNi_{0.8}Co_{0.1}Mn_{0.1}O_3$ | 1 | 60 | 60 | 71 | 52 |
| A24 | $LiNi_{0.8}Co_{0.15}Al_{0.05}O_2$ |  | 1 | 60 | $LaNi_{0.8}Co_{0.2}O_3$ | 1 | 60 | 58 | 84 | 55 |
| A25 | $LiNi_{0.9}Co_{0.07}Al_{0.03}O_2$ |  | 1 | 60 | $LaNi_{0.9}Co_{0.1}O_3$ | 1 | 60 | 60 | 76 | 60 |
| A26 | $LiNi_{0.4}Co_{0.3}Mn_{0.3}O_2$ |  | 1 | 60 | $La_{0.5}Ca_{0.5}Ni_{0.4}Co_{0.3}Mn_{0.3}O_3$ | 1 | 60 | 30 | 89 | 25 |
| A27 |  |  | 1 | 60 | $La_{0.5}Ba_{0.5}Ni_{0.4}Co_{0.3}Mn_{0.3}O_3$ | 1 | 60 | 33 | 87 | 20 |
| A28 |  |  | 1 | 60 | $La_{0.5}Sr_{0.5}Ni_{0.4}Co_{0.3}Mn_{0.3}O_3$ | 1 | 60 | 25 | 89 | 27 |

In positive electrode material B3, $LiPO_4$ particles were caused to adhere, as they were, onto the surface of the positive electrode active material particles, in accordance with a conventional method. The b/a ratio amounted to 35% as a result. In positive electrode materials B1 and B2 produced using $LiPO_4$ particles having a positive charge, the values of b/a ratio were lower than 35%. By contrast, the results of positive electrode materials A1 to A4 revealed that through the use of a lithium conductor having a negative charge, it becomes possible to selectively arrange the lithium conductor at planes other than the (003) plane of the positive electrode active material particles, and to bring as a result the b/a ratio to 50% or higher.

Likewise in positive electrode material B6, $LaNi_{0.4}Co_{0.3}Mn_{0.3}O_3$ particles were caused to adhere, as they were, onto the surface of the positive electrode active material particles, in accordance with a conventional method. As a result the d/c ratio amounted to 37%. In positive electrode materials B4 and B5, produced using $LaNi_{0.4}Co_{0.3}Mn_{0.3}O_3$ particles having a negative charge, the values of d/c ratio were lower than 37%. By contrast, the results of positive electrode materials A5 to A8 revealed that through the use of the electronic conductor having a positive charge, it becomes possible to selectively arrange the electronic conductor at the (003) plane of the positive electrode active material particles, and as a result, to bring the d/c ratio to 50% or higher.

Further, the results of positive electrode materials A9 to A16 and positive electrode materials B7 to B9 revealed that through the combination use of the lithium conductor having a negative charge and the electronic conductor having a positive charge, it becomes possible to produce a positive electrode material in which the lithium conductor is selectively disposed at planes other than the (003) plane of the positive electrode active material particles and in which the electronic conductor is selectively disposed at the (003) plane of the positive electrode active material particles.

In positive electrode materials A1 to A4 and positive electrode materials B1 to B3, the surface of the positive electrode active material particles was coated with a lithium conductor alone. Significant effects in terms of battery resistance reduction, enhanced cycle characteristics (increased capacity retention rate) and suppression of rises in temperature during overcharge were found to be exerted by setting the b/a ratio, being an indicator of the coverage of planes other than the (003) plane of the positive electrode active material particles, to be 50% or higher. In particular, a very significant effect was achieved for rises in temperature during overcharge, which were reduced by about 50%.

In positive electrode materials A5 to A8 and positive electrode materials B4 to B6, the surface of the positive electrode active material particles was coated with an electronic conductor alone. Setting the d/c ratio, being an indicator of the coverage of the (003) plane of the positive electrode active material particles, to be 50% or higher was found to result in a weaker effect than that of a positive electrode material covered with a lithium conductor alone, but pronounced effects were observed however in terms of battery resistance reduction, enhanced cycle characteristics, and suppression of rises in temperature during overcharge.

In positive electrode materials A9 to A16 and positive electrode materials B7 to B9, the surface of the positive electrode active material particles was coated with both a lithium conductor and an electronic conductor. It was found that very pronounced effects in terms of battery resistance reduction, enhanced cycle characteristics and suppression of rises in temperature during overcharge were achieved by prescribing the b/a ratio to be 50% or higher and the d/c ratio to be 50% or higher. In particular, the effect achieved was more pronounced than the sum of the effect elicited by selectively arranging a lithium conductor alone at planes other than the (003) plane of the positive electrode active material particles plus the effect elicited by selectively arranging an electronic conductor alone at the (003) plane of the positive electrode active material particles.

In positive electrode materials A17 to A20, the types of lithium conductor were changed, and there were achieved effects in terms of battery resistance reduction, enhanced cycle characteristics, and suppression of rises in temperature during overcharge. In positive electrode materials A21 to A25, the composition of the positive electrode active material was changed, and the composition of the electronic conductor was changed correspondingly, and there were achieved effects in terms of battery resistance reduction, enhanced cycle characteristics, and suppression of rises in temperature during overcharge. In positive electrode materials A26 to A28, the composition of the electronic conductor was changed, and there were achieved effects in terms of battery resistance reduction, enhanced cycle characteristics, and suppression of rises in temperature during overcharge.

From all the above, it is understood that the positive electrode material for lithium secondary batteries according to the present embodiment allows reducing resistance in a lithium secondary battery. In addition, it is understood that cycle characteristics can be enhanced and rises in temperature during overcharge can be suppressed.

Concrete examples of the present teaching have been explained in detail above, but the examples are merely illustrative in nature, and are not meant to limit the scope of the claims in any way. The art set forth in the claims encompasses various alterations and modifications of the concrete examples illustrated above.

What is claimed is:

1. A positive electrode material for lithium secondary batteries, the material comprising:
    positive electrode active material particles each having a layered structure;
    an electronic conductor disposed on a surface of the positive electrode active material particles; and
    optionally a lithium conductor disposed on the surface of the positive electrode active material particles,
    wherein the electronic conductor is a perovskite-type oxide represented by $ABO_{3-\delta}$ where A is the combination of La and at least one element selected from the group consisting of Ca, Sr and Ba; B is a combination of Co and at least one element selected from the group consisting of Mn and Ni, and $\delta$ is an oxygen deficiency value for achieving electrical neutrality,
    wherein in a case where the positive electrode material contains the lithium conductor, the proportion of the lithium conductor disposed at planes other than the (003) plane of the positive electrode active material particles, with respect to a total amount of the lithium conductor disposed on the surface of the positive electrode active material particles, is not less than 50% and not more than 100%;
    the proportion of the electronic conductor disposed at the (003) plane of the positive electrode active material particles, with respect to at total amount of the electronic conductor disposed on the surface of the positive electrode active material particles, is not less than 50% and not more than 100%.

2. The positive electrode material for lithium secondary batteries according to claim 1, wherein the proportion of the lithium conductor disposed at planes other than the (003) plane of the positive electrode active material particles, with respect to the total amount of the lithium conductor disposed on the surface of the positive electrode active material particles, is not less than 70% and not more than 100%.

3. The positive electrode material for lithium secondary batteries according to claim 1, wherein the proportion of the electronic conductor disposed at the (003) plane of the positive electrode active material particles, with respect to the total amount of the electronic conductor disposed on the surface of the positive electrode active material particles, is not less than 70% and not more than 100%.

4. The positive electrode material for lithium secondary batteries according to claim 1, wherein the positive electrode material contains the lithium conductor.

5. A method for producing a positive electrode material for lithium secondary batteries, the method comprising the steps of:
    preparing positive electrode active material particles each having a layered structure, an electronic conductor having a positive charge, and optionally a lithium conductor having a negative charge; and
    mixing the positive electrode active material particles, the electronic conductor, and optionally the lithium conductor,
    wherein the electronic conductor is a perovskite-type oxide represented by $ABO_{3-\delta}$ where A is the combination of La and at least one element selected from the group consisting of Ca, Sr and Ba; B is a combination of Co and at least one element selected from the group consisting of Mn and Ni, and $\delta$ is an oxygen deficiency value for achieving electrical neutrality.

6. The method according to claim 5, wherein:
    in a case where the positive electrode material contains the lithium conductor, the proportion of the lithium conductor disposed at planes other than the (003) plane of the positive electrode active material particles, with respect to a total amount of the lithium conductor disposed on the surface of the positive electrode active material particles, is not less than 50% and not more than 100%; and
    the proportion of the electronic conductor disposed at the (003) plane of the positive electrode active material particles, with respect to at total amount of the electronic conductor disposed on the surface of the positive electrode active material particles, is not less than 50% and not more than 100%.

7. The method according to claim 5, wherein the proportion of the lithium conductor disposed at planes other than the (003) plane of the positive electrode active material particles, with respect to the total amount of the lithium conductor disposed on the surface of the positive electrode active material particles, is not less than 70% and not more than 100%.

8. The method according to claim 5, wherein the proportion of the electronic conductor disposed at the (003) plane of the positive electrode active material particles, with respect to the total amount of the electronic conductor disposed on the surface of the positive electrode active material particles, is not less than 70% and not more than 100%.

9. The method according to claim 5, wherein the positive electrode material contains the lithium conductor.

10. The positive electrode material for lithium secondary batteries according to claim 2, wherein the proportion of the electronic conductor disposed at the (003) plane of the positive electrode active material particles, with respect to the total amount of the electronic conductor disposed on the surface of the positive electrode active material particles, is not less than 70% and not more than 100%.

* * * * *